United States Patent
Jakab et al.

(10) Patent No.: US 11,384,691 B2
(45) Date of Patent: Jul. 12, 2022

(54) INTEGRATED EXHAUST BAFFLE AND SPLIT LINE RETAINING PLATE

(71) Applicant: Hamilton Sundstrand Corporation, Charlotte, NC (US)

(72) Inventors: Thomas Jakab, Lake Geneva, WI (US); William Boyd Hubbard, Winnebago, IL (US); Jeffrey Todd Roberts, Winnebago, IL (US); Adrian L. Stoicescu, Roscoe, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 187 days.

(21) Appl. No.: 16/811,915

(22) Filed: Mar. 6, 2020

(65) Prior Publication Data

US 2021/0277830 A1     Sep. 9, 2021

(51) Int. Cl.
   *F02C 7/26*     (2006.01)
(52) U.S. Cl.
   CPC .......... *F02C 7/26* (2013.01); *F05D 2220/323* (2013.01); *F05D 2260/85* (2013.01)
(58) Field of Classification Search
   CPC ...... F02C 7/26; F02C 7/277; F05D 2220/323; F05D 2260/85
   See application file for complete search history.

(56) References Cited

U.S. PATENT DOCUMENTS

| 3,838,749 | A | * | 10/1974 | Johnson | F01N 1/08 181/268 |
|---|---|---|---|---|---|
| 4,271,674 | A | * | 6/1981 | Marshall | F23R 3/34 60/737 |
| 5,613,830 | A | * | 3/1997 | Chan | F01D 21/045 415/178 |
| 6,533,541 | B1 | * | 3/2003 | Farnsworth | F01D 21/045 415/121.1 |
| 8,376,700 | B2 | | 2/2013 | Le Saint | |
| 8,506,235 | B2 | | 8/2013 | Norem | |
| 2003/0017045 | A1 | | 1/2003 | Telakowski | |
| 2012/0114475 | A1 | | 5/2012 | Norem | |

OTHER PUBLICATIONS

The Extended European Search Report for Application No. 21160309. 7-1007; dated Jun. 30, 2021; Report Received: Jul. 8, 2021; 7 pages.

* cited by examiner

*Primary Examiner* — Jacob M Amick
*Assistant Examiner* — Charles J Brauch
(74) *Attorney, Agent, or Firm* — Cantor Colburn LLP

(57) ABSTRACT

A baffle is provided herein. The baffle includes a cylindrical baffle section. The cylindrical baffle section includes one or more holes. The baffle also includes a split line retaining section. The split line retaining section includes one or more mounting bosses. Each of the one or more mounting bosses receives one or more mounting bolts.

17 Claims, 6 Drawing Sheets

INTEGRATED EXHAUST BAFFLE AND SPLIT LINE RETAINING PLATE

BACKGROUND

An aircraft generally has a starter associated with its engine. The starter assists the engine with turning on. A starter can include an exhaust baffle design on an exhaust path to prevent debris from exciting or entering the starter. Current exhaust baffle designs have many parts and are labor intensive to assemble. Further, due to the complex nature of assembly, current exhaust baffle designs are susceptible to cracking during use.

BRIEF DESCRIPTION

In accordance with one or more embodiments, a baffle is provided herein. The baffle includes a cylindrical baffle section. The cylindrical baffle section includes one or more holes. The baffle also includes a split line retaining section. The split line retaining section includes one or more mounting bosses. Each of the one or more mounting bosses receives one or more mounting bolts.

In accordance with one or more embodiments or the baffle embodiment above, the baffle includes a one piece design In accordance with one or more embodiments or any of the baffle embodiments above, the baffle can utilize the one or more mounting bolts to position the baffle against a starter.

In accordance with one or more embodiments or any of the baffle embodiments above, the cylindrical baffle section can include a repeating pattern of the one or more holes.

In accordance with one or more embodiments or any of the baffle embodiments above, each hole of the one or more holes can include a cylindrical shape or a slotted shape.

In accordance with one or more embodiments or any of the baffle embodiments above, each hole of the one or more holes can be a quarter inch across.

In accordance with one or more embodiments or any of the baffle embodiments above, the one or more holes can enable exhaust air to pass out of a starter.

In accordance with one or more embodiments or any of the baffle embodiments above, each hole of the one or more holes can include a crescent shape or zigzag shape.

In accordance with one or more embodiments or any of the baffle embodiments above, the baffle can be incorporated into an air-start device.

In accordance with one or more embodiments or any of the baffle embodiments above, an engine of an aircraft can include the air-start device.

In accordance with one or more embodiments, an air-start device is provided. The air-start device includes a starter and a baffle design configured over an exhaust path of the starter. The baffle design includes a cylindrical baffle section comprising one or more holes and a split line retaining section comprising one or more mounting bosses for receiving one or more mounting bolts. The baffle design utilizes the one or more mounting bolts to position the baffle against the starter.

In accordance with one or more embodiments or the air-start device embodiment above, the baffle can include a one piece design.

In accordance with one or more embodiments or any of the air-start device embodiments above, the cylindrical baffle section can include a repeating pattern of the one or more holes.

In accordance with one or more embodiments or any of the air-start device embodiments above, each hole of the one or more holes can include a cylindrical shape or a slotted shape.

In accordance with one or more embodiments or any of the air-start device embodiments above, each hole of the one or more holes can be a quarter inch across.

In accordance with one or more embodiments or any of the air-start device embodiments above, the one or more holes can enable exhaust air to pass out of the starter.

In accordance with one or more embodiments or any of the air-start device embodiments above, each hole of the one or more holes can include a crescent shape or zigzag shape.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
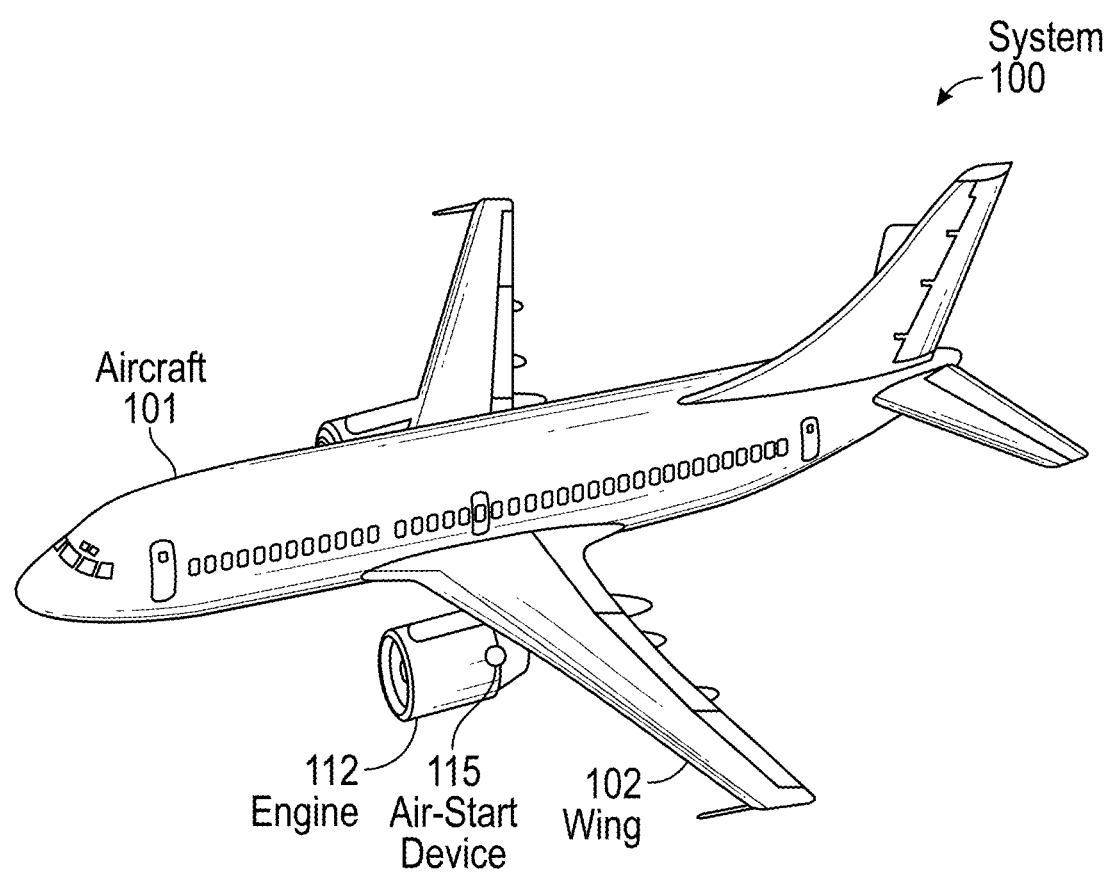
FIG. 1 depicts a system of an aircraft according to one or more embodiments.

FIG. 1 depicts a system 100 of an aircraft 101 (e.g., an airplane including wings 102). The aircraft 101 can be any vehicle that is able to fly by gaining support from air to counter gravity through static lift, dynamic lift, and/or downward thrust. The wings 102 are airfoils that helps lift the 'heavier-than-air aircraft' 101.

The system 100, within the aircraft 101 also may include n engine 112. The engine 112 can be a source of mechanical energy, examples of which include at least gas and jet turbine engines. The engine 112 can be located on the wing 102 of the aircraft 101 and can include an air-start device 115. The air-start device 115 is a power source used to provide the initial rotation to start the engine 112.

Figure 2:
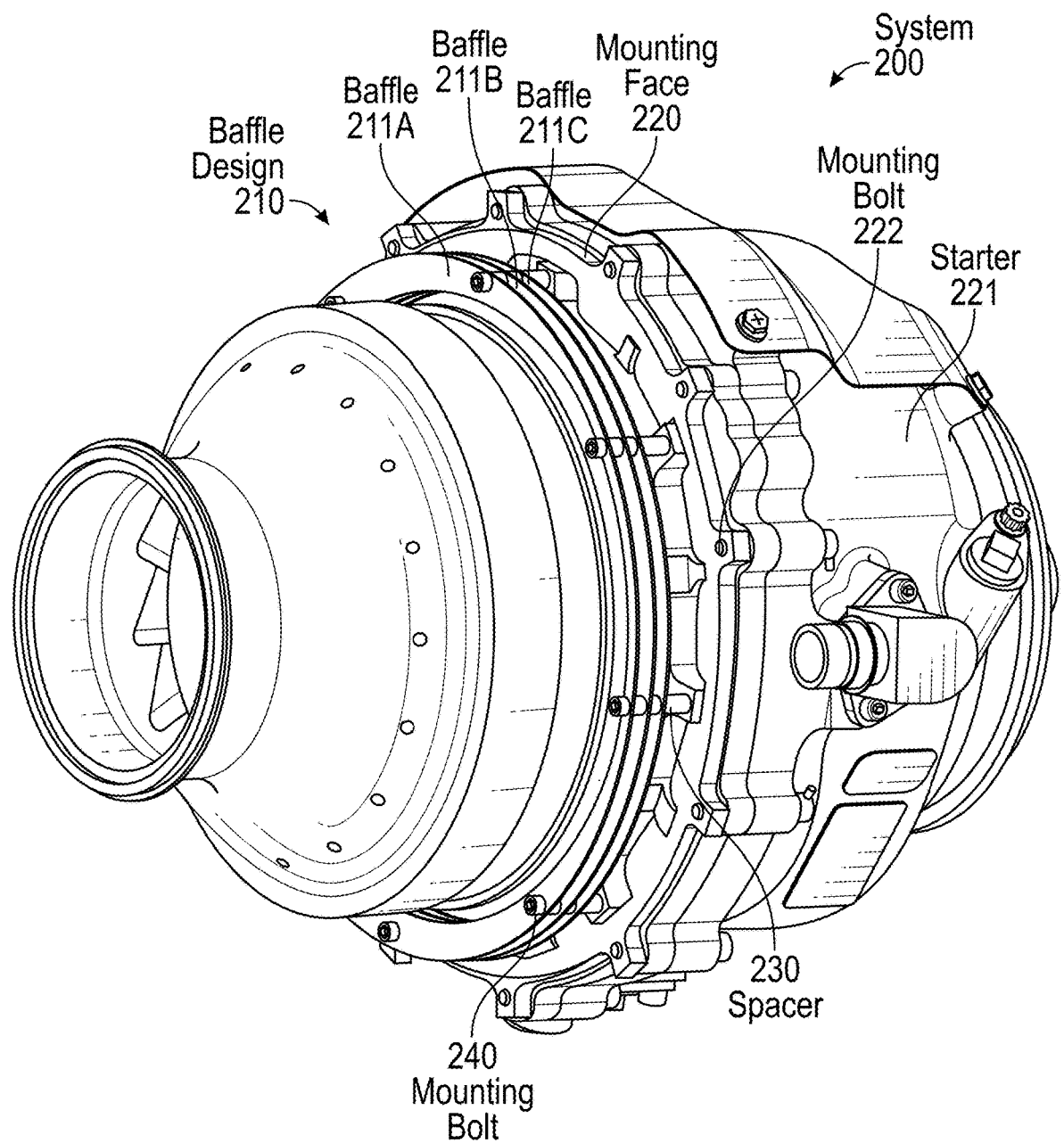
FIG. 2 is a perspective view of a system comprising a current baffle design accordingly to background art.

Turning to FIG. 2, a perspective view of a system 200 comprising a baffle design 210 accordingly to background art is provided. The system 200 is an example of the air-start device 115 of FIG. 1. The baffle design 210 includes one or more individual baffles (as shown three baffles 211A, 211B, and 211C), each of which is mounted in parallel to a mounting face 220. The mounting face 220 can be further held to a starter 221 by one or more mounting bolts 222. Each of the one or more individual baffles 211A, 211B, and 211C are further separated by spacers 230. For each set of spacers (e.g., referred to as a spacer stack), a mounting bolt 240 is used to position the baffles 210 and the spacers 230 to the mounting face 220. In this regard, for each mounting bolt 240, a spacer stack can include a number of spacers equal to the number of the one or more baffles 211A, 211B, and 211C plus one. As the system 200 typically includes between 8-12 mounting bolts 240, the parts for the baffle design 210 can include one or more baffles (e.g., the three baffles 211A, 211B, and 211C shown), 8-12 mounting bolts 240, and 32-48 or more spacers 230.

Figure 3:
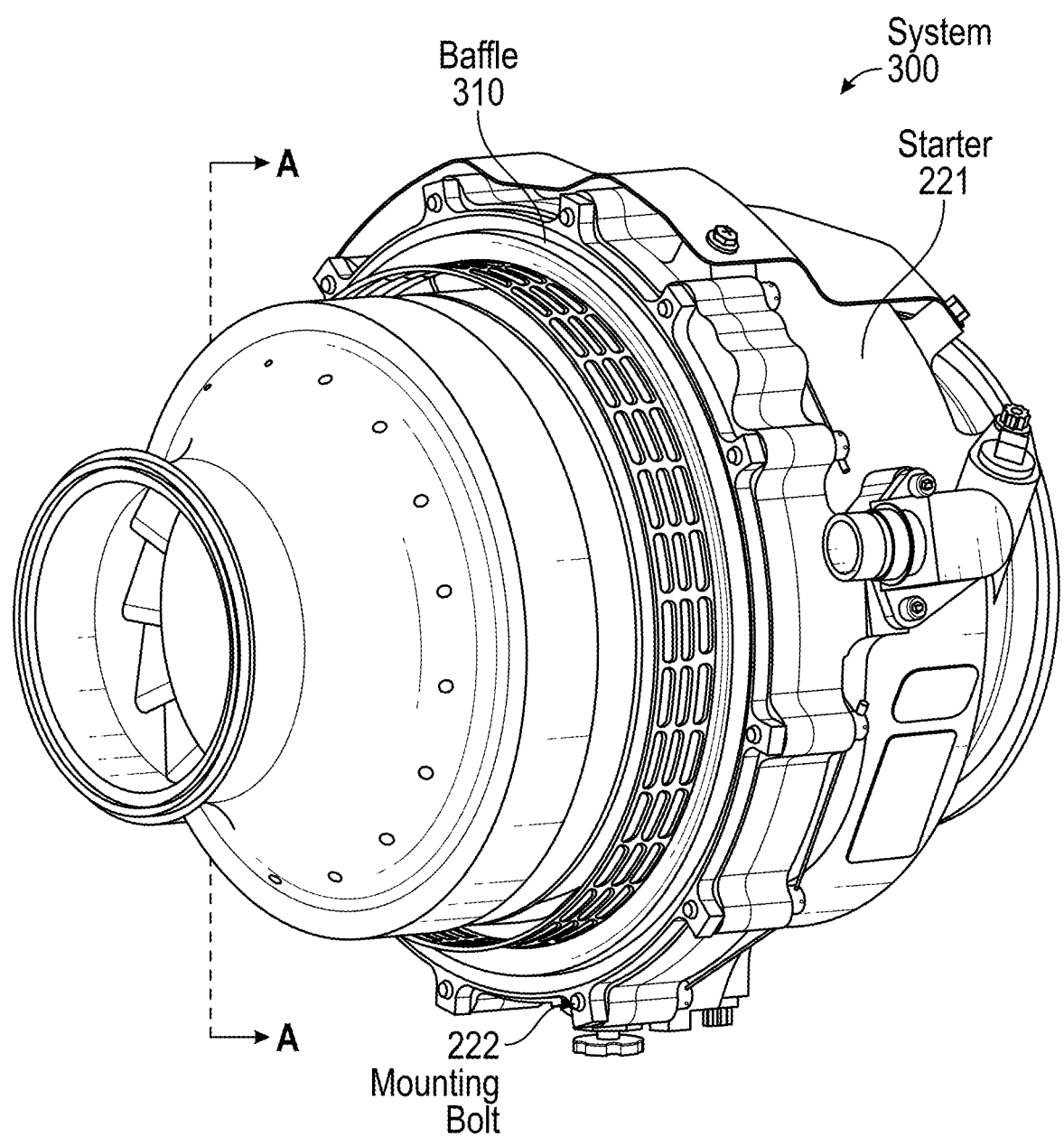
FIG. 3 is a perspective view of a system comprising a baffle accordingly to one or more embodiments.

FIG. 3 is a perspective view of a system 300 comprising a baffle 310 accordingly to one or more embodiments. The system 300 is an example of the air-start device 115 of FIG. 1. The system 300 of FIG. 3 will further be described with respect to FIGS. 4-5, with the numerical identifiers being reused for brevity. The baffle 310 can be a one piece design that replaces the multiple individual baffles 211A, 211B, and 211C, the mounting face 220, and the spacers 230 of the baffle design 210 of FIG. 2. In this regard, the baffle 310 utilizes the mounting bolts 222 to be held against the starter 221 (e.g., share a same mounting configuration as the mounting face 220). Note that FIG. 4 is a perspective view of the baffle 310 of the system of FIG. 3 according to one or more embodiments, and note that FIG. 5 is a cross section of the system 300 of FIG. 3 along demarcation A-A according to one or more embodiments.

Figure 4:
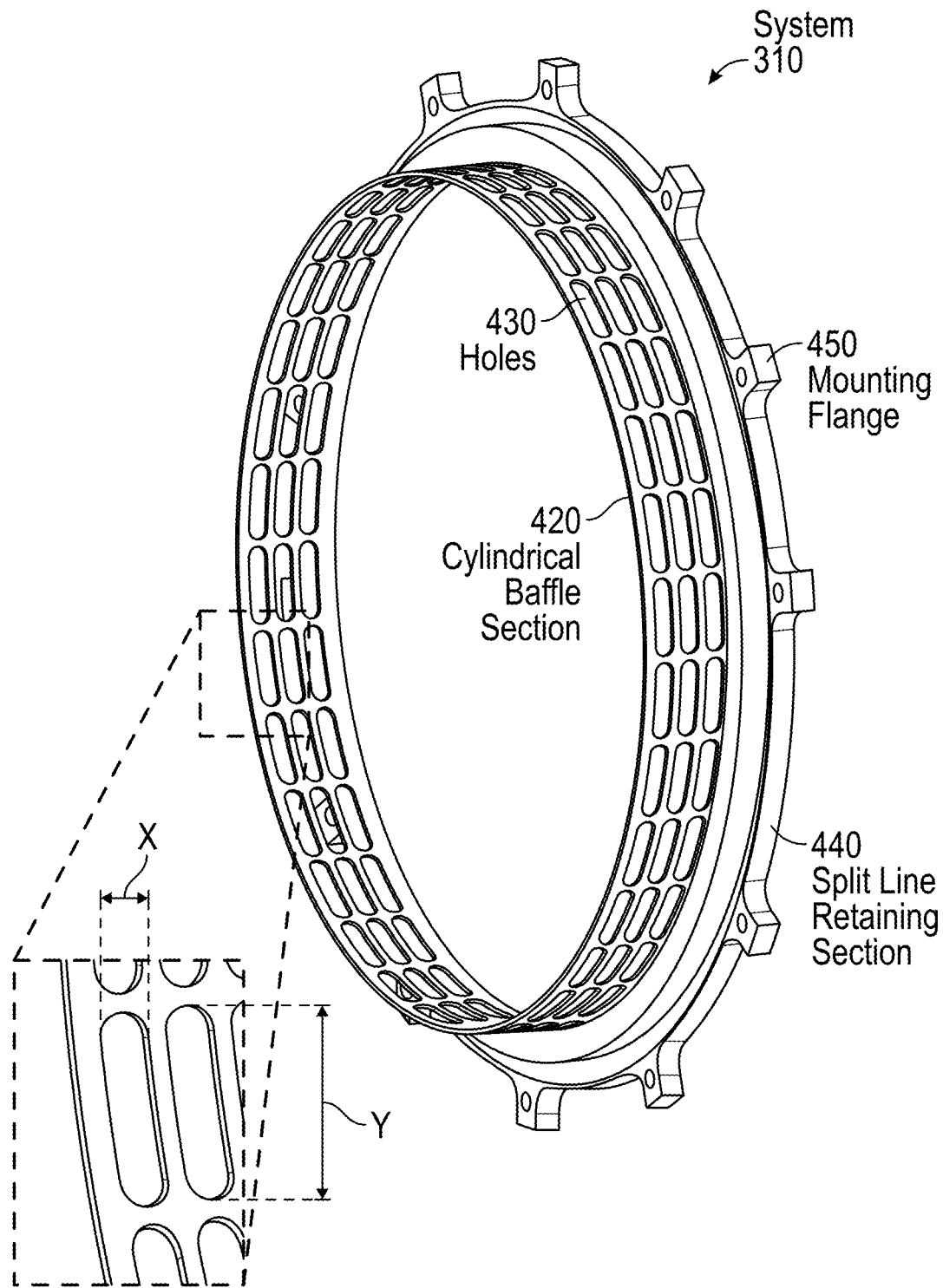
FIG. 4 is a perspective view of the baffle of the system of FIG. 2 according to one or more embodiments.
Figure 5:
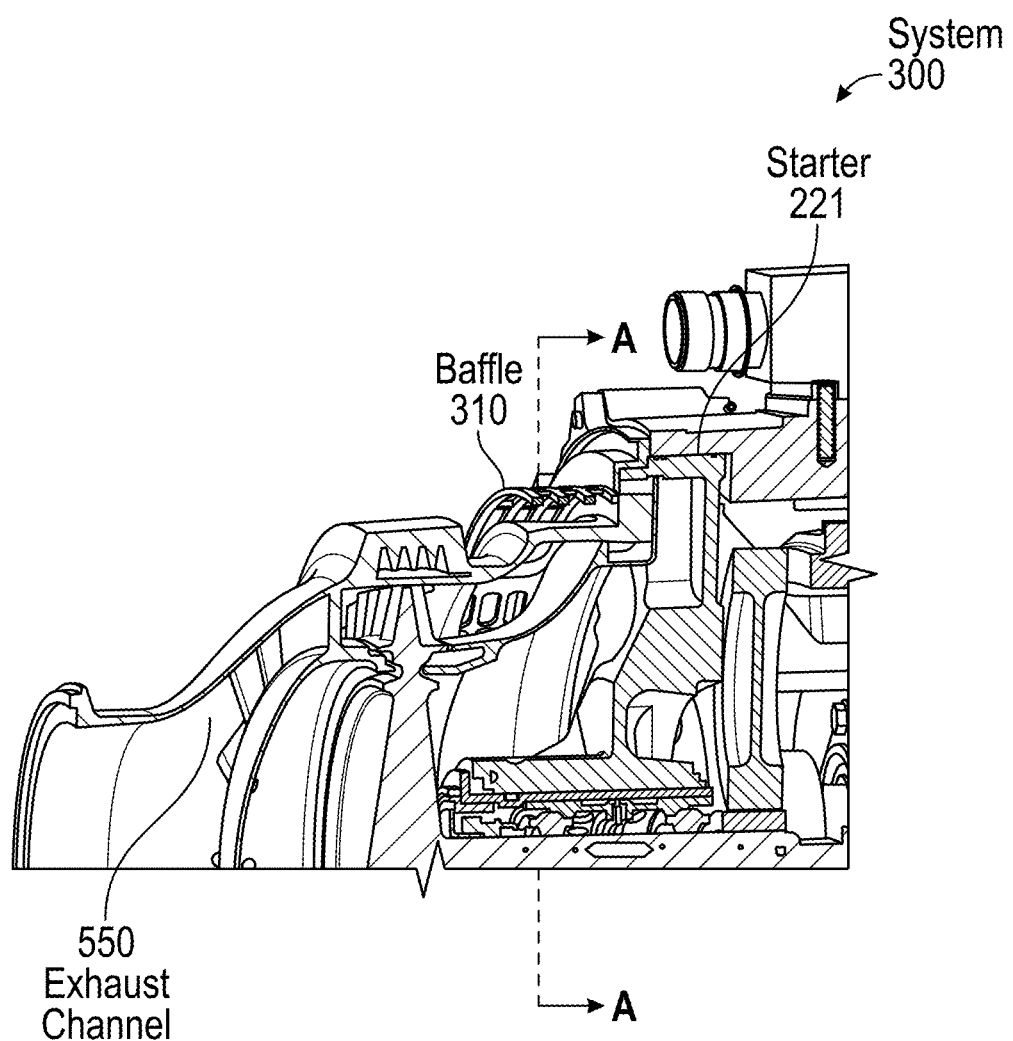
FIG. 5 is a cross section of the system of FIG. 2 according to one or more embodiments.

Turning to FIG. 4, the baffle 310 can be a one piece design that includes a cylindrical baffle section 420 with a repeating pattern of holes 430 (e.g., elliptical shape, cylindrical shape, slotted shape, or otherwise) and is integral to a split line retaining section 440. Further, the split line retaining section 440 includes one or more mounting bosses 450 that align with the mounting bolts 222. The one or more mounting bosses 450 are representative of one or more tabs, flanges, collars, ribs, rims, or any other projecting object, serving to attach the baffle 310 to the starter 221. The repeating pattern of holes 430 enable exhaust air to pass, yet still contain fragments that may come through the exhaust path, and prevent any foreign object debris from entering the starter 221 through an exhaust 550 (e.g., which begins to the right side of turbine rotor as shown in FIG. 5).

For example, the repeating pattern of holes 430 may be designed to provide a fix area, which is a sum of a surface area of each hole 430. This fixed area provides exhaust air to pass through the exhaust 550 at a rate needed for the system 300 to operate. Simultaneously, because each of the repeating pattern of holes 430 is individually sized fragments that may come through the exhaust 550 are contained and foreign object debris external to the system 300 are prevented from entering the starter 221.

Figure 6:
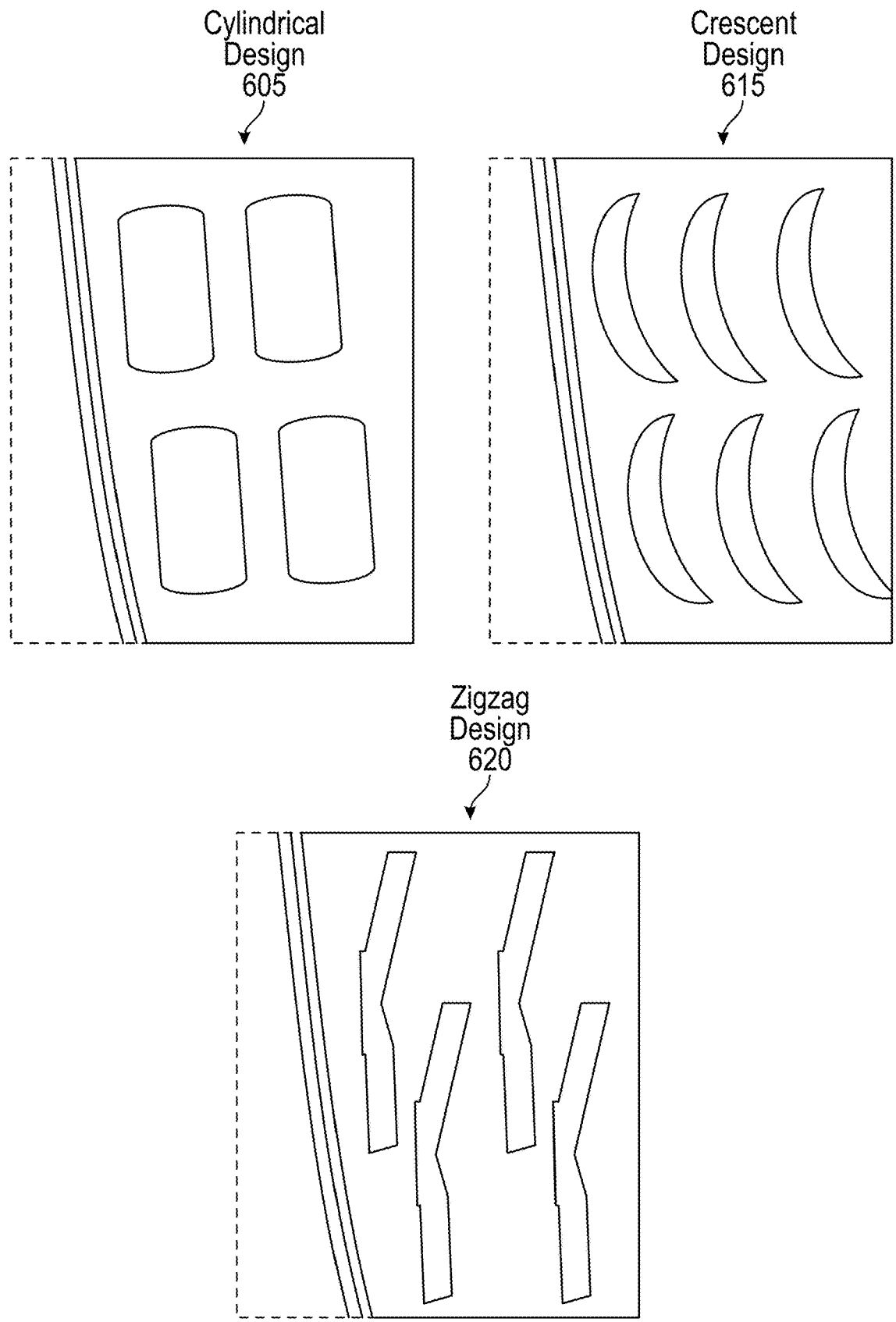
FIG. 6 depicts examples of hole designs for a baffle according to one or more embodiments.

The baffle 310 is configurable during manufacturing. For example, the baffle 310 can be sculpted through laser jet cutting from a single piece of material (metal or otherwise). One or more of the holes 430 can be individually configured by size, shape, and/or location. For example, each of the one or more of the holes 430 can be a quarter inch in diameter and/or across (e.g., in either the X or Y direction as shown in FIG. 4) to limit size of debris that can leave the starter 221. In accordance with one or more embodiments, the baffle 310 can be manufactured with cylindrical shaped holes, crescent shaped holes, and/or zigzag shaped holes. For example, FIG. 6 depicts examples of hole designs for a baffle according to one or more embodiments. As shown, the one or more of the holes 430 can be a cylindrical shaped hole design 605, crescent shaped hole design 615, or zigzag shaped hole design 625. The number of holes 430 as well as their size dictates an air flow. The baffle 310 ensures that the air flow is not statistically significantly more restrictive than if the baffle 310 was not installed. In accordance with one or more embodiments, the baffle 310 is configured to provide less than 1% difference (i.e., decrease) in torque output of the starter 221 (e.g., which results from flow restriction). In this regard, the baffle 310 did not impact performance of the starter 221 from a flow perspective, while greatly improving assembly, increasing strength, and decreasing weight of the system 300.

The technical effects and benefits of the baffle 310 greatly simplify an assembly process of the system 300. For instance, instead of needing to mount multiple exhaust baffles, align spacers, and configure the bolt assemblies, the baffle 310 as a retaining plate is installed. Further, the baffle 310 also allows for weight savings (by the elimination of multiple pieces) and strength advantages (given the integrated design; e.g., the structure of the baffle 310 is stronger and will resist cracking and having aerodynamic forces exciting it's resonant mode). The technical effects and benefits of the baffle 310 also include enabling a completely customizable configuration of holes to create an asymmetric radial exhaust flow that prevents direct exhaust impingement on sensitive components, while not degrading overall exhaust flow.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A baffle for a turbine exhaust exit of a starter comprising:
   a cylindrical baffle section comprising one or more holes; and
   a split line retaining section comprising one or more mounting bosses for receiving one or more mounting bolts,
   wherein the one or more holes are organized in a pattern extending three-hundred and sixty degrees circumferentially around the cylindrical baffle section.

2. The baffle of claim 1, wherein the baffle comprises a one piece design.

3. The baffle of claim 1, wherein the baffle utilizes the one or more mounting bolts to position the baffle against a starter.

4. The baffle of claim 1, wherein each hole of the one or more holes comprises a cylindrical shape or a slotted shape.

5. The baffle of claim 4, wherein each hole of the one or more holes is a quarter inch in across.

6. The baffle of claim 1, wherein the one or more holes enable exhaust air to pass out of a starter.

7. The baffle of claim 1, wherein each hole of the one or more holes comprises a crescent shape or zigzag shape.

8. The baffle of claim 1, wherein the baffle is incorporated into an air-start device.

9. The baffle of claim 8, wherein an engine of an aircraft comprises the air-start device.

10. An air-start device comprising:
- a starter having a turbine and a turbine exhaust exit; and
- a baffle design configured over the turbine exhaust exit of the starter, the baffle design comprising:
    - a cylindrical baffle section comprising one or more holes; and
    - a split line retaining section comprising one or more mounting bosses for receiving one or more mounting bolts,
- wherein the baffle design utilizes the one or more mounting bolts to position the baffle against the starter,
- wherein the one or more holes are organized in a pattern extending three-hundred and sixty degrees circumferentially around the cylindrical baffle section.

11. The air-start device of claim 10, wherein the baffle comprises a one piece design.

12. The air-start device of claim 10, wherein each hole of the one or more holes comprises a cylindrical shape or a slotted shape.

13. The air-start device of claim 12, wherein each hole of the one or more holes is a quarter inch across.

14. The air-start device of claim 10, wherein the one or more holes enable exhaust air to pass out of the starter.

15. The air-start device of claim 10, wherein each hole of the one or more holes comprises a crescent shape or zigzag shape.

16. The baffle of claim 1, wherein the one or more holes are configured to create an asymmetric radial exhaust flow exiting the starter.

17. The air-start device of claim 10, wherein the one or more holes are configured to create an asymmetric radial exhaust flow exiting the starter.

* * * * *